United States Patent [19]

Carder et al.

[11] 4,273,633

[45] Jun. 16, 1981

[54] RADIATION CURABLE DISPERSIONS CONTAINING HIGH MOLECULAR WEIGHT ESSENTIALLY NONPOLYMERIZABLE VINYL RESINS

[75] Inventors: Charles H. Carder, Amma; Joseph V. Koleske, Charleston, both of W. Va.

[73] Assignee: Union Carbide Corporation, New York, N.Y.

[21] Appl. No.: 47,237

[22] Filed: Jun. 11, 1979

[51] Int. Cl.³ ............................................ C08F 259/04
[52] U.S. Cl. ...................... 204/159.17; 260/23 XA; 260/23 EP; 525/305; 525/317; 525/307
[58] Field of Search .................. 260/23 XA, 23 EP; 204/159.17; 525/317, 305, 286

[56] References Cited

U.S. PATENT DOCUMENTS

| | | | |
|---|---|---|---|
| 3,061,531 | 10/1962 | Smith | 204/159.17 |
| 3,359,193 | 12/1967 | Pinner | 204/159.17 |
| 3,840,448 | 10/1974 | Osborn et al. | 260/23 EP |
| 3,943,103 | 3/1976 | Borden et al. | 428/462 |
| 3,996,394 | 12/1976 | Harris | 204/159.17 |

*Primary Examiner*—Wilbert J. Briggs, Sr.
*Attorney, Agent, or Firm*—Francis M. Fazio

[57] ABSTRACT

Dispersions of high molecular weight, essentially nonpolymerizable vinyl resins in mixtures of radiation curable monofunctional and polyfunctional acrylyl monomers and/or oligomers. The dispersions are useful as coating and ink compositions.

8 Claims, No Drawings

RADIATION CURABLE DISPERSIONS CONTAINING HIGH MOLECULAR WEIGHT ESSENTIALLY NONPOLYMERIZABLE VINYL RESINS

BACKGROUND OF THE INVENTION

In recent years, the trend toward higher processing speeds, the shortage of organic solvents, air pollution regulations and the energy crisis have all served to increase the already substantial interest in high-solids coatings and inks that can be cured by brief exposures to radiation. These systems normally contain reactive monomers rather than inert solvents, and cure by the radiation-induced polymerization of the ink or coating composition.

As this concept has grown from the research stage into commercialization, the technology has been applied to a wide variety of situations, i.e., a host of different substrates have been coated by means varying from roll coater to lithographic press, and cured by means varying from electron beam to ultraviolet light to heat. The radiation-induced free radical polymerization or cure often results in some volume shrinkage, with the actual amount of shrinkage varying from system to system. This shrinkage in many instances results in poor adhesion, particularly to rigid substrates.

One approach to solving the adhesion problem has been the inclusion of vinyl resins. The excellent performance of vinyls on rigid substrates has been recognized for many years—however, difficulties were encountered in incorporating them in acrylate-radiation curable systems. High viscosities were encountered when only small amounts of conventional vinyl resins were dissolved in the reactive monomers.

Lower molecular weight vinyls were prepared, and were found to be considerably more useful. At a given viscosity, it was observed that considerably more vinyl could be incorporated, and adhesion to many substrates was improved. This information was the basis for U.S. Pat. No. 3,943,103. The only problem associated with the use of these materials is the necessity of formulating very, very carefully when solvent resistance is desired.

SUMMARY OF THE INVENTION

Dispersions containing (1) a mixture of radiation curable monofunctional and polyfunctional acrylyl monomers and/or oligomers and (2) a high molecular weight, essentially non-polymerizable vinyl resin dispersed therein. The compositions can be applied by conventional means and readily cure to products showing improved adhesion, flexibility, and solvent resistance properties.

DESCRIPTION OF THE INVENTION

The compositions of this invention are dispersions of finely particulate high molecular weight vinyl resins in a mixture of acrylyl monomers and/or oligomers. As used herein the term "acrylyl" represents both the acrylate and methacrylate moieties. The dispersions are to be distinguished over the known compositions which are generally solutions of resins in reactive monomers. It was completely unexpected and unobvious to find that dispersions, wherein the vinyl resin is present in particulate form, would produce cured compositions, such as films, having clarity, adhesion, flexibility and solvent and chemical resistance to the extent noted. It was also unexpected and unobvious to discover that the resins in dispersed form could be added at higher concentrations than if they had been dissolved while still maintaining adequate fluidity. It was found that when the vinyl resin was dispersed rather than dissolved, an almost negligible decrease in fluidity was noted, thus permitting the formulator to prepare compositions that are readily applied by a variety of techniques.

The compositions of this invention contain as the principle ingredients a high molecular weight vinyl resin dispersed in finely particulate form and a mixture of mono-functional and polyfunctional acrylyl monomers and/or oligomers, all as hereinafter described. The compositions can additionally contain photoinitiators, pigments and other additives such as flow control agents, fungicides, antistats, or any of the other additives normally present in such compositions can be added. The types and amounts thereof are well known to those skilled in the art and do not require further elaboration herein since any of the conventional materials can be used in the conventionally employed quantities.

The high molecular weight vinyl chloride resins that are used in the curable compositions of this invention are the vinyl chloride homopolymers and copolymers having an inherent viscosity of at least 0.7, preferably from about 0.8 to 1.3 as determined by ASTM D-1243. The suitable vinyl chloride resins are well known to those skilled in the art and many are commercially available. Suitable vinyl chloride copolymers are those containing up to about 20 mole percent of one or more ethylenically unsaturated comonomer polymerized therein. Illustrative of such comonomers one can mention ethylene, styrene, acrylic acid, methacrylic acid, maleic acid, acrylamide, methyl acrylate, ethyl acrylate, glycidyl acrylate, 2-ethylhexyl acrylate, butoxyethyl acrylate, 2-hydroxypropyl acrylate, acrylonitrile, methacrylonitrile, butadiene, vinylidene chloride, vinyl butyrate, vinyl butyral, vinyl methyl ketone, acrolein, methacrolein, vinyl ethyl ether, vinyl ethyl sulfone, vinyl pyridine, vinyl acetate or any of the methacrylates of the previously identified acrylate compounds. The specific compounds herein mentioned are merely illustrative and are not to be considered all inclusive; those skilled in the art are fully familiar with the known polymerizable ethylenically unsaturated comonomers.

The vinyl chloride resins used are essentially non-polymerizable and they are capable of being dispersed in the composition by conventional mixing and grinding procedures. In this application the term "essentially non-polymerizable" means that the resin does not further polymerize to any significant extent when the composition of this invention is given sufficient exposure to radiation to cure the fully formulated composition containing the acrylyl components.

Those skilled in the art are fully aware of the many different vinyl chloride resins available and the distinction between solution vinyls and dispersion vinyls. While both types can be used, the dispersion vinyl resins are the preferred resin type since they have exhibited the greatest ease of dispersion in the compositions, show little increase in viscosity of the composition, exhibited good chemical resistance and enabled the ready preparation of clear films.

The mixture of acrylyl monomers and/or oligomers is a mixture of monofunctional and polyfunctional compounds. In this mixture the monofunctional acrylyl compounds constitute from about 35 to 85 weight percent of the mixture, preferably from about 50 to about 70 weight percent, and the polyfunctional acrylyl compounds constitute from about 15 to about 65 weight percent of the mixture, preferably from about 30 to about 50 weight percent. These acrylyl compounds are well known to those skilled in the art and many of them are commercially available.

Illustrative of the suitable monofunctional acrylyl compounds one can mention methyl acrylate, ethyl acrylate, propyl acrylate, isopropyl acrylate, butyl acrylate, isobutyl acrylate, t-butyl acrylate, 2-ethylhexyl acrylate, pentyl acrylate, isodecyl acrylate, 2-hydroxyethyl acrylate, 2-hydroxypropyl acrylate, dicyclopentenyl acrylate, (methylcarbamoyloxy)ethyl acrylate, 2-phenoxyethyl acrylate, 2-methoxy ethyl acrylate, 2-(N,N-diethylamino)ethyl acrylate, the acrylate esters of epoxidized oleic acid or stearic acid or ricinoleic acid, as well as the corresponding methacrylates of all of the above. The preferred are the acrylate esters due to the known sluggishness of the reactivity of the methacrylate esters in comparison thereto.

The suitable polyfunctional acrylyl compounds are those containing two to 6, or more unsaturated or acrylyl groups. Illustrative thereof one can mention neopentyl glycol diacrylate, ethylene glycol diacrylate, propylene glycol diacrylate, diethylene glycol diacrylate, hexylene glycol diacrylate, trimethylolpropane triacrylate, pentaerythritol di-, or tri-, or tetra-acrylate or mixtures thereof, acrylated fatty acid and fatty oil epoxides such as acrylated linseed oil or soybean oil or tall oil or linoleic acid or linolenic acid or eleostearic acid or arachidonic acid, as well as the corresponding methacrylates of the above, as well as other polyfunctional acrylate compounds known to those skilled in the art. The preferred polyfunctional compounds are the polyacrylate esters, however, also useful are such polyfunctional acrylyl compounds as vinyl acrylate and vinyl methacrylate.

The radiation curable dispersion compositions of this invention contain from about 10 to about 50 weight percent, preferably from about 20 to about 40 weight percent, of the high molecular weight essentially nonpolymerizable vinyl resin and from about 50 to about 90 weight percent, preferably from about 60 to about 80 weight percent of the mixture of acrylyl monomers. The compositions are readily prepared by mixing the components and then blending the entire mixture in a ball mill or in a high speed mixer to obtain a uniform dispersion of the vinyl resin in the acrylyl monomers. The time required for uniform mixing will vary depending upon the particular components used and the size of the batch. All of the procedures and equipment are known to those skilled in the art. Generally, mixing is continued until the solid vinyl resins have been reduced to a particle size below about 10 to 15.

The compositions are applied by conventional coating and printing methods known to those skilled in the art and they can be cured by the known radiation curing methods such as electron beam or ultraviolet light radiation. As previously indicated, a photoinitiator is generally required when ultraviolet light radiation is used. The particular photoinitiator to be used and the concentration thereof will vary with the specific coating composition if one is to obtain optimum results; it is generally present at a concentration of from about 0.5 to 10 weight percent. Any of the known photo-initiators can be used and illustrative thereof one can mention benzophenone, benzoin, acetophenone, benzoin methyl ether, Michler's ketone, benzoin butyl ether, thioxanthone, propiophenone, xanthone, fluorenone, carbazole, diethoxyacetophenone, the 2- or 3- or 4-methylacetophenones or methoxyacetophenones, the 2- or 3-chloroxanthones or chlorothioxanthones, 2-acetyl-4-methylphenyl acetate, 2,2'-dimethoxy-2-phenylacetophenone. These can be used alone, in admixture or in the presence of activators such as amine compounds. Illustrative thereof are, for example, diethanolamine, triethylamine, triphenylamine, tri-2-chloroethylamine, triethanolamine, 2-methylpyridine, piperazine, morpholine. Curing can be with conventional low, medium or high pressure mercury lamps. Cure can be carried out in air or under an inert gas atmosphere e.g., argon, nitrogen. The time for cure will vary depending upon the particular energy source used, the composition of the coating, the thickness of the film and the surrounding atmosphere conditions. The equipment used in the cure and the conditions under which cure can be conducted are well known to those skilled in the art of radiation technology. Likewise, the time periods required are well known to those skilled in the art and do not require further elucidation.

The cured films were evaluated by the procedures described in H. A. Gardner and G. G. Sward, Physical and Chemical Examination of Paints, Varnishes, Lacquers and Colors, 11 Edition, Gardner Laboratory, Bethesda, Md. 1950:

Sward Hardness—compared to glass at 100; pp. 164–6.

Impact Resistance—falling tube impact device; pp. 173–5.

Adhesion was measured by percentage of film remaining after a Scotch (MMM No. 610) tape pull on a grid of razor blade cuts, 10 in each direction, ⅛ inch apart.

Acetone resistance, a measure of through-cure, was determined by placing a small swatch of cotton or paper saturated with acetone on the cured film (on a metal substrate), then measuring the time required (in seconds) for the film to be lifted off the substrate. The cotton is kept saturated with acetone during the test.

Pencil hardness—ASTM D-3363-74
60° Gloss—ASTM D-523-67
Inherent viscosity—ASTM D-1243.

The following examples serve to further illustrate the invention; parts are by weight unless otherwise indicated.

EXAMPLE 1

Comp. A.

A composition was produced, for comparative purposes and as the control composition, containing 16 parts of neopentyl glycol diacrylate, 8 parts of 2-ethylhexyl acrylate, 16 parts of 2-hydroxyethyl acrylate, 16 parts of the acrylate ester of linseed oil epoxide and 1 part of diethoxyacetophenone.

Comp. B.

A dispersion was produced by adding 30 parts of a 95/5 vinyl chloride/vinyl acetate copolymer dispersion resin having an intrinsic viscosity of about 1 to 70 parts of Composition A and then grinding to form a fine dispersion of the polymer having a Hegman grind below 8 N.S. National Standard. The desired particle size was obtained in ten minutes using a high speed stirrer (5.5 N.S.) or in 16 hours using a pebble mill grind (7.5 N.S.).

Wet coatings about 0.6 mil thick were applied to steel surfaces and cured by exposure to ultraviolet light radiation, under nitrogen. In both instances complete cure was obtained and the dry films were then evaluated; the average of the results were:

|  | Comp. A | Comp. B |
|---|---|---|
| Dry film thickness, mils | 0.40 | 0.37 |
| Gloss, 60° | 98 | 85 |
| Sward hardness | 32 | 30 |
| Pencil hardness | H | F |
| Crosshatch adhesion, % | 50-100 | 100 |
| Face impact resistance, in-lb | 165 | 165 |
| Reverse impact resistance, in-lb | 80-90 | >165 |
| Acetone resistance, sec. | >300 | >300 |

As shown by the results Comp. B of this invention evidenced improved increased flexibility as shown by the higher reverse impact resistance properties and improved adhesion. Comp. B coatings consistently showed 100% adhesion, whereas, Comp. A coatings varied in their adhesion to the metal substrate in the range shown.

EXAMPLE 2

A series of dispersions was prepared using different poly(vinyl chloride) dispersion resins. In all instances the dispersions contained 30 parts of the resin per 70 parts of Comp. A of Example 1. The mixtures were ground in a pebble mill for about 8 hours to a Hegman grind of 8 N.S. The dispersions were separately applied to steel panels and cured as described in Example 1. The results are tabulated below and compared to the control, Comp. A, that did not contain poly(vinyl chloride).

| PVC Resin | a | b | c | d | e | (Comp. A) (Ex. 1) |
|---|---|---|---|---|---|---|
| Inherent viscosity (Av.) | 1.3 | 1.2 | 0.9 | 1.26 | 1.25 |  |
| Film thickness (mils) | 0.34 | 0.25 | 0.3 | 0.27 | 0.3 | 0.40 |
| 60° Gloss | 53 | 89 | 88 | 90 | 89 | 98 |
| Sward hardness | 16 | 34 | 32 | 34 | 34 | 32 |
| Pencil hardness | 2B | F-H | H | F | H | H |
| Crosshatch adhesion, % | 100 | 100 | 100 | 100 | 100 | 50-100 |
| Acetone resistance, sec. | >300 | >300 | >300 | >300 | >300 | >300 |
| Face impact resistance, in-lb | 50-80 | >135 | >135 | >140 | >165 | >165 |
| Reverse impact resistance, in-lb | >165 | 85 | 100 | 70 | 55 | 80 |

The results shown in examples 1 and 2 illustrate that radiation curable compositions can be produced in which a high molecular weight vinyl chloride resin is present in particulate form, as a dispersion, and that these compositions will yield satisfactory cured coatings showing good adhesion, solvent resistance and impact resistance. It was a completely unexpected and unobvious discovery to find that the resin did not have to be dissolved in the acrylate monomers vehicle to afford a good coating for radiation cure. In the examples, the coated dispersions cured to dry films on exposure to ultraviolet radiation for only a fraction of a second. Thus, there was no thermal cure involved and no elevation in temperature that would have resulted in melting or dissolution by heat of the discrete resin particles. It was also observed that postheating of the cured films had little effect on their properties.

Attempts were made to produce dispersions with other resins; these attempts met with varying degrees of success. Among the resins so evaluated were poly(ethylene glycol), polycaprolactone, poly(ethylene/methacrylic acid), poly(vinyl acetate), phenolics, styrene copolymers. In many such instances the resins were soluble in the vehicle and did not produce dispersions. In some instances the dispersions was not stable to storage; this deficiency was observed with a 60/40 vinyl chloride/acrylonitrile copolymer having an intrinsic viscosity of about 1.2. At a concentration of 30 weight percent in Comp. A of Example 1, a satisfactory dispersion was initially obtained but eventually separation occurred with the resin particles settling to the bottom. Such problems are known to exist by those skilled in the art and precautions can be taken in the laboratory to ascertain the existence of the problem and either correct it or refrain from using such compositions in commerce.

What is claimed is:

1. A dispersion comprising essentially (A) from about 10 to about 50 weight percent of an essentially non-polymerizable, high molecular weight vinyl chloride resin having an inherent viscosity above about 0.7 measured at 30° C. using cyclohexanone as the solvent and a concentration of 0.2 gram of resin per deciliter of solution dispersed in (B) from about 50 to about 90 weight percent of a mixture of acrylyl compounds, said mixture of acrylyl compounds constituted of from about 35 to about 85 weight percent of monofunctional acrylyl compound and from about 15 to about 65 weight percent of polyfunctional acrylyl compound.

2. A dispersion as claimed in claim 1 wherein component (A) is present at a concentration of from about 20 to about 40 weight percent and component (B) is present at a concentration of from about 60 to about 80 weight percent.

3. A dispersion as claimed in claim 1 wherein component (A) has an inherent viscosity of from about 0.8 to about 1.3.

4. A dispersion as claimed in claim 2 wherein component (A) is homopolymeric poly(vinyl chloride).

5. A dispersion as claimed in claim 2 wherein component (A) is the copolymer of vinyl chloride and up to about 20 mole percent of one or more ethylenically unsaturated monomer.

6. A dispersion as claimed in claim 1 wherein component (A) is homopolymeric poly(vinyl chloride) and component (B) is a mixture of 2-hydroxyethyl acrylate, 2-ethylhexyl acrylate, neopentyl glycol diacrylate and the acrylate of epoxidized linseed oil.

7. A dispersion as claimed in claim 1 wherein component (A) is a copolymer of vinyl chloride and vinyl acetate and component (B) is a mixture of 2-hydroxyethyl acrylate, 2-ethylhexyl acrylate, neopentyl glycol diacrylate and the acrylate of epoxidized linseed oil.

8. A dispersion as claimed in claim 1 wherein a photoinitiator is also present.

* * * * *